United States Patent

[11] 3,612,905

[72] Inventor Charles R. Cook, Jr.
North Palm Beach, Fla.

[21] Appl. No. 783,480
[22] Filed Dec. 13, 1968
[45] Patented Oct. 12, 1971

[73] Assignee International Telephone and Telegraph Corporation
Nutley, N.J.

[54] SOLID-STATE BIDIRECTIONAL SWITCHING CIRCUIT
9 Claims, 3 Drawing Figs.

[52] U.S. Cl. ........ 307/254, 307/241, 307/249
[51] Int. Cl. ........ H03k 17/00
[50] Field of Search ........ 307/250, 253, 254, 241, 242, 243, 249

[56] References Cited
UNITED STATES PATENTS

| | | | |
|---|---|---|---|
| 3,148,286 | 9/1964 | Pickering et al. | 307/241 |
| 3,418,494 | 12/1968 | Reed | 307/243 |
| 3,431,435 | 3/1969 | Bizet | 307/242 |

*Primary Examiner*—Donald D. Forrer
*Assistant Examiner*—B. P. Davis
*Attorneys*—C. Cornell Remsen, Jr., Walter J. Baum, Percy P. Lantzy, Philip M. Bolton, Isidore Togut and Charles L. Johnson, Jr.

ABSTRACT: This is a bidirectional solid-state switching circuit having DC ground isolation between the activating signal and the output. The activating signal powers an oscillator which generates an RF signal. The RF signal is coupled to two detectors by two very small capacitors which establishes the DC ground isolation. When an RF signal is present, the detectors provide the proper biasing to turn on two transistors which are connected in parallel wherein the emitter and collector of the first transistor is connected to the collector and emitter of the second transistor respectively, the output being taken across the parallel combination.

INVENTOR
CHARLES R. COOK, JR.
BY Isidore Togut
ATTORNEY

SOLID-STATE BIDIRECTIONAL SWITCHING CIRCUIT

BACKGROUND OF THE INVENTION

This invention relates to a solid-state circuit which provides for the bidirectional flow of information having DC isolation between the activating input signal and the bidirectional output signal.

In present telephone switching circuitry, relays are being utilized at control centers to switch main lines which correspond to a number that has been dialed by the customer. There is an inherent time lag in the switching system, since a line cannot be switched until the relay which has been activated, holds. This time lag is generally one millisecond and is ultimately a limitation upon the system capacity in sending information. The relays are generally large in size and take up a large amount of space. A solid-state circuit which could replace the function of a relay could overcome the basic disadvantage of a relay since the switching speed could be reduced to far less than 182 second and would also take up much less space than a relay. However, conventional solid-state circuits do not furnish isolation between the activating signal and the output signal and solid-state switches such as transistors, do not have bidirectional characteristics. In order for a transistor to operate bidirectionally, quite often you are required to supply an input level which is much higher than the total voltage applied between output terminals of a device.

SUMMARY OF THE INVENTION

An object of this invention is to provide a solid-state switching circuit having DC isolation between the activating signal and the output.

It is another object of this invention to have an output circuit that can bidirectionally pass electric signals which are not dependent upon voltage levels applied across the output terminals.

It is a further object to provide a solid-state switching circuit which can inexpensively be produced as monolithic integrated circuits.

According to a broad aspect of this invention there is provided a solid-state switching circuit having DC isolation between the input and output of said circuit comprising means for receiving an activating signal and converting said activating signal to an RF signal, said receiving means having a first and second output terminal and a first DC ground reference, means for detecting said RF signal, said detecting means being DC isolated from said first DC ground reference, means to couple said receiving means to said detecting means, and switching means for providing bidirectional flow of electrical signals, said switching means being coupled to said detecting means so that upon the appearance of said activating signal, said receiving means causes the generation of said RF signal, whereby said RF signal is detected and turns said switching means to a mode of operation that provides for said bidirectional flow of electrical signals and in the absence of said activating signal, said switching means turns to a blocking mode of operation.

A feature of this invention is provided by having an oscillator circuit function as said receiving means wherein said activating signal activates said oscillator by operating as the source of power for said oscillator.

Another feature of this invention provides that said switching means include a first and second transistor each having an emitter, base and collector, said emitter and base of said first and second transistor being coupled to said first and second detecting circuits respectively, said first emitter being connected to said second emitter, whereby said circuit output is taken across the common emitter and collector connections.

DESCRIPTION OF THE PREFERRED EMBODIMENTS

Figure 1:
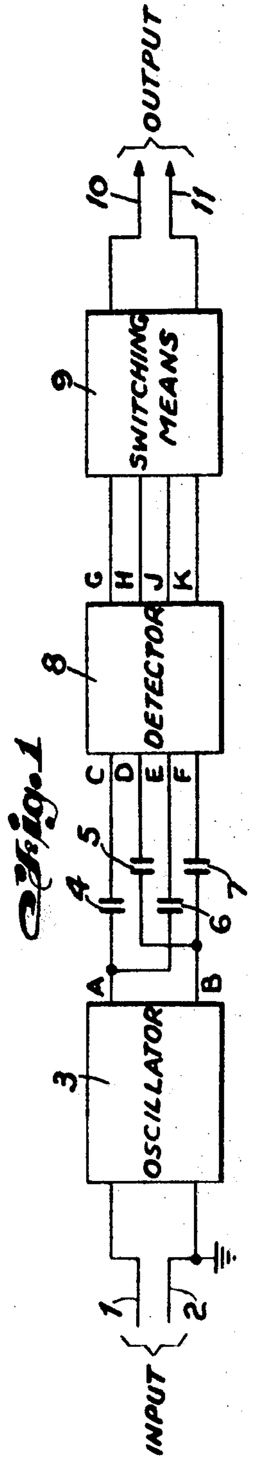
FIG. 1 shows a block diagram of the switching circuit described in this application.

A block diagram of the solid-state switching circuit is shown in FIG. 1, wherein an activating input signal is applied across terminals 1 and 2 and is fed into oscillator 3, terminal 2 being the ground connection for the activating signal. When the activating signal is applied to the oscillator, a RF signal is therein generated and appears across output terminals A and B of the oscillator circuit.

The RF signal is coupled through capacitors 4, 5, 6 and 7 to inputs C, D, E and F, respectively, of detector circuit 8, the capacitance being approximately 10 pf. or less for each capacitor and are primarily used to provide DC isolation between the input ground 2 and the detector circuit. The extent of DC isolation provided by these capacitors is determined by the breakdown voltage of any capacitor.

When detector 8 receives the RF signal, it is converted to a mode that when applied across terminals G and H and J and K, respectively, and coupled to switching means 9, the switching means are switched to a low impedance mode of operation, the output being taken across terminals 10 and 11. Since switching means 9 has a bidirectional characteristic, electric signals can flow from 10 to 11 or from 11 to 10 respectively.

We have thus produced a circuit which has the quality of a relay such as providing for bidirectional flow of information and having DC isolation, while having none of the disadvantages of the relays such as large size and slow switching speed. Due to the DC isolation between the oscillator circuitry and the detector this circuit has good noise rejection qualities. This is accomplished by converting the activating signal to an RF signal of approximately 40 to 100 mHz. The RF generated signal is coupled to the detector circuit through the capacitors while the activating input signal, along with DC noise and AC noise below the frequency of the RF generated signal, is blocked by these capacitors thus providing DC isolation between the input digital signal and the detected RF signal. The fact that the coupling capacitor can be 10 pf. or less and the remaining circuitry is comprised of resistors, diodes and transistors renders this circuit approach adaptable for integrated circuits.

It is clearly seen that by increasing the frequency of the oscillator circuit and further decreasing the capacitance of the coupling capacitors, we can further decrease the DC and AC noise in the circuit, since a smaller coupling capacitor will provide a greater impedance for DC and AC noise, while easily passing the higher frequency RF generated signals.

Figure 2:
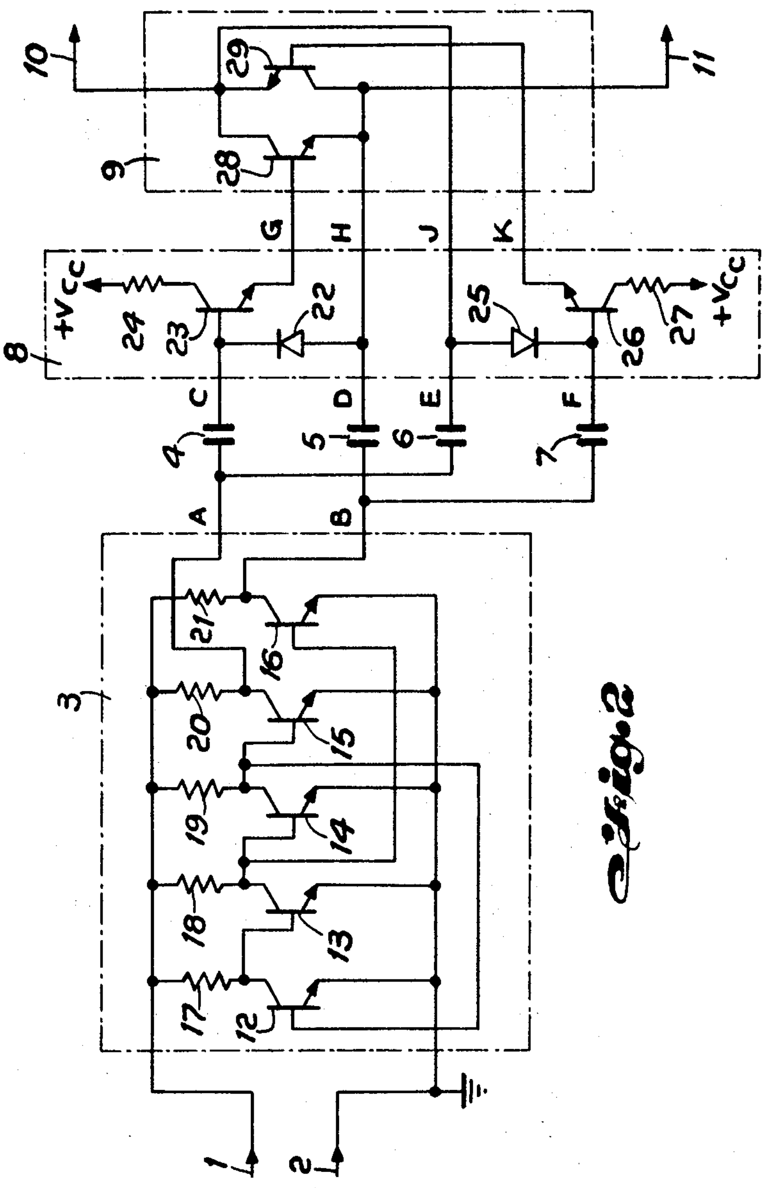
FIG. 2 is a circuit diagram of the block diagram shown in FIG. 1.

The circuit operation can best be understood by analyzing the circuit shown in FIG. 2. It is seen that the activating input signal is applied between input terminals 1 and 2 to oscillator 3. As can be seen from observing FIG. 2 the input signal to the oscillator happens to be the source of power for activating said oscillator. Transistors 12, 13 and 14 are connected to the source of power through collector resistors 17, 18 and 19 respectively, while the emitter of each of the transistors is connected to ground 2. With the collector of transistor 12 connected to the base of 13, the collector of transistor 13 connected to the base of transistor 14 and the collector of transistor 14 connected to the base of transistor 12, the basic oscillator circuit is established. When the activating signal of sufficient voltage level is applied to the circuit, the oscillator will oscillate at a high RF frequency due to the positive feedback path existing between the collector of transistor 14 and the base of transistor 12. Transistors 15 and 16 are used to amplify the oscillating signal so as to increase the output voltage swing of the oscillating signal at the output of the oscillator. The collector of transistor 14 is connected to the base of transistor 15 and the collector of transistor 13 is connected to the base of transistor 16. The emitters of transistors 15 and 16 have the same common oscillator ground while the collectors of transistors 15 and 16 are connected to the same oscillator supply through resistors 20 and 21 respectively. Thus, the outputs of the amplifiers are then established at the collector of transistor 15 at terminal A and at the collector of transistor 16 at terminal B wherein the oscillator output is taken across terminals A and B where the two out-of-phase signals from the oscillator circuit appear. This out-of-phase relationship further increases the potential difference between terminals A and B and thus increases the signal applied to the detector circuit.

The main advantage of using this oscillator circuit arises from the fact that the oscillator power is supplied by the activating input circuit thereby eliminating the noise which might enter this system from the supply voltage. Furthermore, a common mode input to the oscillator is established. Thus the oscillator circuit will only recognize differential input signals and will reject all common mode noise which will appear across the input terminals 1 and 2. Typical component values for the oscillator are 1 KΩ for resistive components 17, 18 and 19 and 330Ω for resistive components 20 and 21, with the selected transistors having an $f_T$ (frequency response) of at least 400 mHz. In the monolithic integrated circuit version of this oscillator circuit, the transistors can have an $f_T$ as high as 1 KmHz and with the elimination of stray wire capacitance, we would achieve higher oscillating frequencies which would permit the use of smaller coupling capacitors and thus increase DC and AC noise rejection.

The detector consists of two identical circuits, the first circuit being coupled to capacitors 4 and 5 at terminals C and D respectively, and the second circuit being coupled to capacitors 6 and 7 at terminals E and F respectively. Each detector circuit receives the RF signal and converts it to a bias means for turning the switching means to a mode of operation that provides for the bidirectional flow of electrical signals.

Each circuit has rectifying means such as diodes 22 and 25 placed across the respective input terminals wherein the cathode of each respective diode is attached to the base of respective transistors 23 and 26. The collector of each output transistor is connected to a supply voltage through respective resistors 24 and 27. A typical supply voltage used is about 5 volts and resistors 24 and 27 can have a typical value of around 6 kΩ. The emitters of transistors 23 and 26 are coupled to the switching means by way of terminals G and K respectively, while the anodes of diodes 22 and 25 are coupled to the switching means by way of terminals H and J respectively. When the RF signal is applied across input terminals C and D and as soon as the voltage at C becomes more positive that the voltage at D, diode 22 is reversed biased and the emitter-base diode of transistor 23 starts to become forward biased. As soon as the threshold voltage of the emitter-base diode of transistor 23 is reached, transistor 23 turns on. Now, when C becomes negative with respect to D and diode 22 conducts, the emitter-base junction of transistor 23 is no longer forward biased and tends to start to turn off. The voltage at the collector will remain low for the period of time it takes to supply the charge to the collector through resistor 24 before it has turned off, point C has again become positive with respect to D, thereby forward biasing the emitter-base junction of transistor 23. Thus transistor 23 tends to remain in the on condition as long as the RF oscillating signal appears across the input of the detector. As soon as there is no input signal to the oscillator circuit and therefore no high frequency RF signal appearing across points C and D, transistor 23 turns off. The exact operation is repeated for the other detector circuit when the RF signal is applied across terminals E and F. Therefore, it is clearly seen that as long as an RF signal appears across terminals A and B, both of transistors 23 and 26 will be in a conducting mode and provide the proper biasing to control the state of the switching means.

Figure 3:
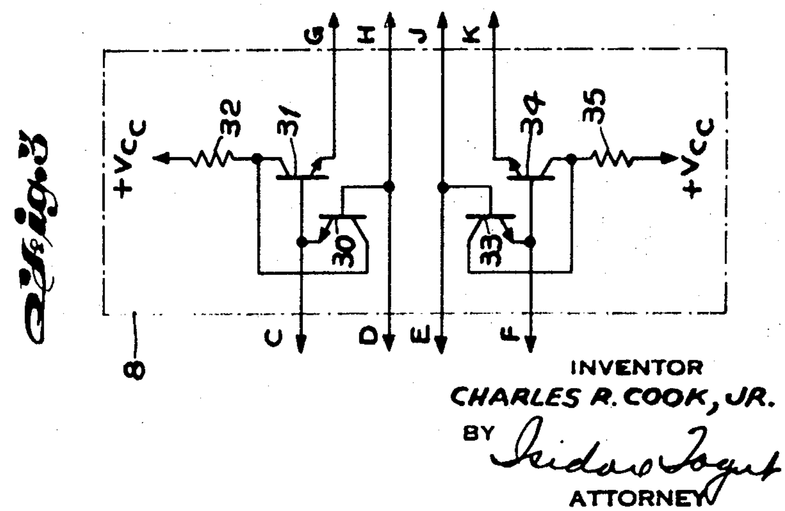
FIG. 3 shows a second embodiment of the detector referred to in FIG. 1 and shown in FIG. 2.

FIG. 3 shows another embodiment of the detector circuit wherein the detector can be made to operate twice as efficiently as the detector shown in FIG. 2. This is accomplished by replacing the input diodes 22 and 25 with input transistors 30 and 33 respectively, wherein the emitter-base diode of transistors 22 and 25 is connected across inputs C and D, and E and F respectively, the emitter of transistors 30 and 33 being connected to the base of output transistors 31 and 34 respectively. The collector of transistors 30 and 33 are connected to the collectors of transistors 31 and 34 respectively, which in turn are connected to supply voltage $V_{cc}$ through respective resistors 32 and 35. The emitters of transistors 31 and 34 are coupled to the switching means by way of terminals G and K respectively, while the bases of transistors 30 and 33 are coupled to the switching means by way of terminals H and J respectively.

The basic difference in operation of this circuit shown in FIG. 3 over the detector shown in FIG. 2 is that transistors 30 and 33 together are on twice as long as the single transistor 23 in FIG. 2. Similarly, transistors 31 and 34 are on twice as long as the single transistor 26 in FIG. 2.

This is accomplished as follows. When C is positive with respect to D, the emitter-base diode of transistor 30 is reversed biased and the emitter-base diode of transistor 31 becomes forward biased, thereby turning transistor 31 on. When C becomes negative with respect to D, the emitter-base diode of transistor 30 becomes forward biased and current flows from the collector to the emitter of transistor 30. This current then flows from the base to the emitter of transistor 31 which keeps transistor 31 in the on condition through both half cycles of the oscillating signal appearing across the detector input terminals C and D. The exact operation is again repeated for the other detector circuit when the RF signal is applied across terminals E and F.

The switching means shown in FIG. 2, consist of transistors 28 and 29 connected in parallel so that the emitter of transistor 28 is connected to the collector of transistor 29 and the emitter of transistor 29 is connected to the collector of transistor 28. The base and emitter of transistor 28 are connected to terminals G and H respectively, while the base and emitter of transistor 29 are connected to terminals J and K respectively. The system output is taken across terminals 10 and 11 respectively, which are coupled to the common collector and emitter connections for transistors 28 and 29 of the switching means.

Thus when an activating signal of sufficient DC level is received by the oscillator 3, an amplified RF signal appears across terminals A and B. This RF signal is then detected and transistors 23 and 26 turn on. Since the emitter of transistors 23 and 26 are coupled to the base of transistors 28 and 29, respectively, transistors 23 and 26 simultaneously drive transistors 28 and 29 on. Thus, depending on the polarity of the voltage potential at 10 with respect to 11, electrical information can pass from collector to emitter of transistor 28, or collector to emitter of transistor 29, thereby providing for bidirectional flow of information.

When the activating signal no longer appears at the input of the oscillator, the RF signal is no longer generated and transistors 23 and 26 of the detector turn off, thereby simultaneously turning transistors 28 and 29 off.

Thus, we have a circuit which has an activating signal which can turn a bilateral switch on, wherein the activating signal is DC isolated, by capacitors 4, 5, 6 and 7, from the output taken across terminals 10 and 11. The final product herein provides for the essential feature of a relay, namely DC isolation between the input and output. The advantages this circuit has over that of a relay are related to the faster switching speed of this circuit, greater long term reliability, and the adaptability to integrated circuits which may result in lower cost at high volume.

When building this circuit on a monolithic integrated circuit, the input and output must definitely be isolated from each other and this would best be carried out on an N-type substrate using dielectric isolation or any other suitable well-known technique.

What is claimed is:

1. A solid-state switching circuit having DC isolation between the input and output of said circuit comprising:

means for receiving an activating signal and converting said activating signal to an RF signal, said receiving means having a first and second output terminal and a first DC ground reference;

means for detecting said RF signal, said detecting means being DC from said first DC ground reference, said detecting means including at least a first detecting circuit, said first detecting circuit having a first and second input terminal;

means to couple said receiving means to said detecting means, said coupling means including at least a first coupling circuit, said first coupling circuit couples said receiving means to said first detecting circuit, said first coupling circuit including a first and second capacitor, said first capacitor of said first coupling circuit being connected between said first output terminal of said receiving means and said first input terminal of said first detecting circuit, said second capacitor of said first coupling circuit being connected between said second output terminal of said receiving means and said second input terminal of said first detecting circuit, said capacitors providing DC ground isolation between said receiving means and said first detecting circuit, said isolation being determined by the breakdown voltage of said capacitors; and switching means for providing bidirectional flow of electrical signals, said switching means being coupled to said detecting means so that upon the appearance of said activating signal, said receiving means causes the generation of said RF signal, whereby said RF signal is detected and turns said switching means to a mode of operation that provides for said bidirectional flow of electrical signals, and in the absence of said activating signal, said switching means turns to a blocking mode of operation.

2. A circuit according to claim 1 wherein said coupling means includes a second coupling circuit and said detecting means includes a second detecting circuit, said second coupling circuit couples said receiving means to said second detecting circuit, said second detecting circuit having a first and second input terminal.

3. A circuit according to claim 2 wherein said second coupling circuit includes a first and second capacitor, said first capacitor of said second coupling circuit being connected between said first output terminal of said receiving means and said first input terminal of said second detecting circuit, said second capacitor of said second coupling circuit being connected between said second output terminal of said receiving means and said second input terminal of said second detecting circuit, said first and second capacitors of said respective first and second coupling circuits providing DC ground isolation between said receiving means and said first and second detecting circuits, said isolation being determined by the breakdown voltage of said capacitors.

4. A circuit according to claim 2 wherein the capacitance of said capacitors is less than 10pf.

5. A circuit according to claim 1 wherein said receiving means is an oscillator circuit, and said activating signal activates said oscillator by operating as the source of power for said oscillator.

6. A circuit according to claim 5 wherein said oscillator circuit includes a first, second, third, fourth and fifth transistor having an emitter, base and collector, each collector being connected to said activating signal through a resistor, each emitter being connected to said first ground source, said first collector being connected to said second base, said second collector being connected to said third and fifth base and said third collector being connected to said first and fourth base, said oscillator output being taken between said fourth and fifth collector.

7. A circuit according to claim 2 wherein each detecting circuit comprises an input diode having an anode and a cathode, and a transistor having an emitter base and collector, said cathode of said diode being connected to said base and said second input terminal of said detecting circuit, said collector being connected to a supply voltage through a first resistor, said anode of said diode being connected to said firs input terminal of said detecting circuit, said emitter and anode being coupled to said switching means so that when said R.F. signal is applied across said diode said transistor is always on and provides sufficient biasing current to turn said switching means to said bi-directional mode of operation and in the absence of said R.F. signal said transistor turns off and turns said switching means to said blocking mode of operation.

8. A circuit according to claim 2 wherein each detecting circuit is comprised of a first and second transistor each having an emitter, base and collector, said first emitter and base being connected across said second and first input terminals respectively of said detecting circuit, said first emitter being connected to said second base, said first collector being connected to said second collector, said second collector being connected to a supply voltage through a resistor, said first base and said second emitter being coupled to said switching means so that when an R.F. signal is applied across said input terminals of said detecting circuit, said second transistor is always on and provides sufficient biasing current to turn said switching means to said bi-directional operating mode and in the absence of said R.F. signal, said second transistor turns off and turns said switching means to said blocking mode of operation.

9. A circuit according to claim 2 wherein said switching means include a first and second transistor each having an emitter, base and collector, said emitter and base of said first and second transistor being coupled to said first and second detecting circuit respectively, said first emitter being connected to said second collector and said first collector being connected to said second emitter, whereby said circuit output is taken across the common emitter and collector connections.